US012651424B2

(12) United States Patent
Ren et al.

(10) Patent No.: US 12,651,424 B2
(45) Date of Patent: Jun. 9, 2026

(54) IMAGE HARMONIZATION FOR IMAGE STITCHING SYSTEMS AND APPLICATIONS

(71) Applicant: NVIDIA Corporation, Santa Clara, CA (US)

(72) Inventors: Yuzhuo Ren, Sunnyvale, CA (US); Yining Deng, Fremont, CA (US); Dawid Stanislaw Pajak, San Carlos, CA (US); Robin Jenkin, Santa Clara, CA (US); Niranjan Avadhanam, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 115 days.

(21) Appl. No.: 18/507,740

(22) Filed: Nov. 13, 2023

(65) Prior Publication Data

US 2025/0157170 A1 May 15, 2025

(51) Int. Cl.
*G06V 10/10* (2022.01)
*G06T 3/4015* (2024.01)
(Continued)

(52) U.S. Cl.
CPC ............ *G06V 10/16* (2022.01); *G06T 3/4015* (2013.01); *G06T 5/70* (2024.01); *G06T 5/80* (2024.01); *G06T 5/92* (2024.01); *G06V 10/60* (2022.01)

(58) Field of Classification Search
CPC ...... G06V 10/16; G06V 10/60; G06T 3/4015; G06T 5/70; G06T 5/80; G06T 5/92; G06T 3/4038
See application file for complete search history.

(56) References Cited

U.S. PATENT DOCUMENTS 10,885,698 B2   1/2021  Muthler et al.
2009/0262260 A1*  10/2009  Jaynes ................. H04N 9/3182
                                              348/744

(Continued)

OTHER PUBLICATIONS

"Tone Mapping", Delta, Blog by @64, Retrieved from Internet URL: https://64.github.io/tonemapping/, accessed on Sep. 16, 2023, pp. 1-23 (May 10, 2019).

(Continued)

*Primary Examiner* — Xiao M Wu
*Assistant Examiner* — Latrell Anthony Creary
(74) *Attorney, Agent, or Firm* — Freestone Intellectual Property Law PLLC

(57) ABSTRACT

In various examples, metadata-based image harmonization for image stitching systems and applications are disclosed. Systems and methods are disclosed that preprocess images with respect to rendering parameters, with the effect of blending those parameters at a border between images to facilitate a smooth rendering when those images are stitched together. An image signal processing (ISP) parameter harmonization function may input metadata parameters associated with a set of images to match and blend one or more of the rendering parameters across an overlapping border between images prior to applying those images to a stitching algorithm. A scaling of the metadata parameter may be performed using a parameter gain function. Pixels in both images located along the border are adjusted to the same boundary metadata parameter value, and smoothed based on the parameter gain function. A discontinuity in rendering parameters is avoided, substantially avoiding corresponding artifacts in the resulting stitched image.

20 Claims, 12 Drawing Sheets

(51) Int. Cl.
    *G06T 5/70*          (2024.01)
    *G06T 5/80*          (2024.01)
    *G06T 5/92*          (2024.01)
    *G06V 10/60*        (2022.01)

(56)           References Cited

U.S. PATENT DOCUMENTS

| | | | |
|---|---|---|---|
| 2022/0148317 A1* | 5/2022 | Herrmann | B60R 11/0235 |
| 2022/0207756 A1 | 6/2022 | Ren et al. | |
| 2024/0289929 A1* | 8/2024 | Sun | G06T 7/50 |
| 2025/0086835 A1* | 3/2025 | Dong | G06T 7/33 |
| 2025/0124893 A1* | 4/2025 | Pundak | H04N 21/4854 |

OTHER PUBLICATIONS

"Logistic function", Wikipedia, Retrieved from Internet URL: https://en.wikipedia.org/wiki/Logistic_function, accessed on Sep. 16, 2023, pp. 1-15.

Selan, J., "Chapter 24. Using Lookup Tables to Accelerate Color Transformations", NVIDIA Developers, Sony Pictures Imageworks, GPU Gems 2, Retrieved from Internet URL: https://developer.nvidia.com/gpugems/gpugems2/part-iii-high-quality-rendering/chapter-24-using-lookup-tables-accelerate-color, accessed on Sep. 16, 2023, pp. 1-9.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

"Exposure compensation", Wikipedia, Retrieved from Internet URL: https://en.wikipedia.org/wiki/Exposure_compensation, accessed on Nov. 16, 2023, 1-3 pages.

"Gamma correction", Wikipedia, Retrieved from Internet URL: https://en.wikipedia.org/wiki/Gamma_correction, accessed on Nov. 16, 2023, 1-13 pages.

"Tone mapping", Wikipedia, Retrieved from Internet URL: https://en.wikipedia.org/wiki/Tone_mapping, accessed on Nov. 16, 2023, 1-7 pages.

Reinhard, E., et al., "Color Transfer between Images", IEEE Computer Graphics and Applications, Retrieved from Internet URL: https://www.cs.tau.ac.il/~turkel/imagepapers/ColorTransfer.pdf, pp. 34-41 (Sep./Oct. 2001).

Pulli, K., "Camera Processing Pipeline", VP Computational Imaging Light, Retrieved from Internet URL: https://web.stanford.edu/class/cs231m/lectures/lecture-11-camera-isp.pdf, accessed on Nov. 17, 2023, pp. 1-78.

Ren, Y., et al., In U.S. Unpublished U.S. Appl. No. 17/959,934, filed Oct. 4, 2022, titled "Image Stitching With Color Harmonization for Surround View Systems and Applications".

\* cited by examiner

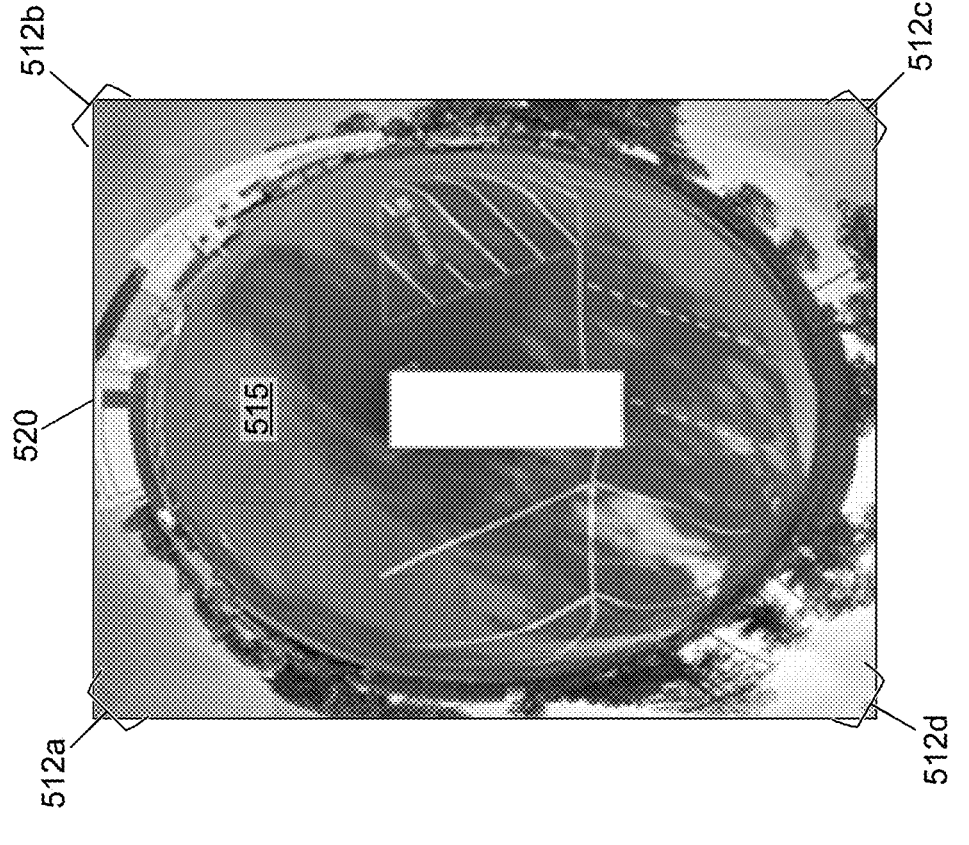
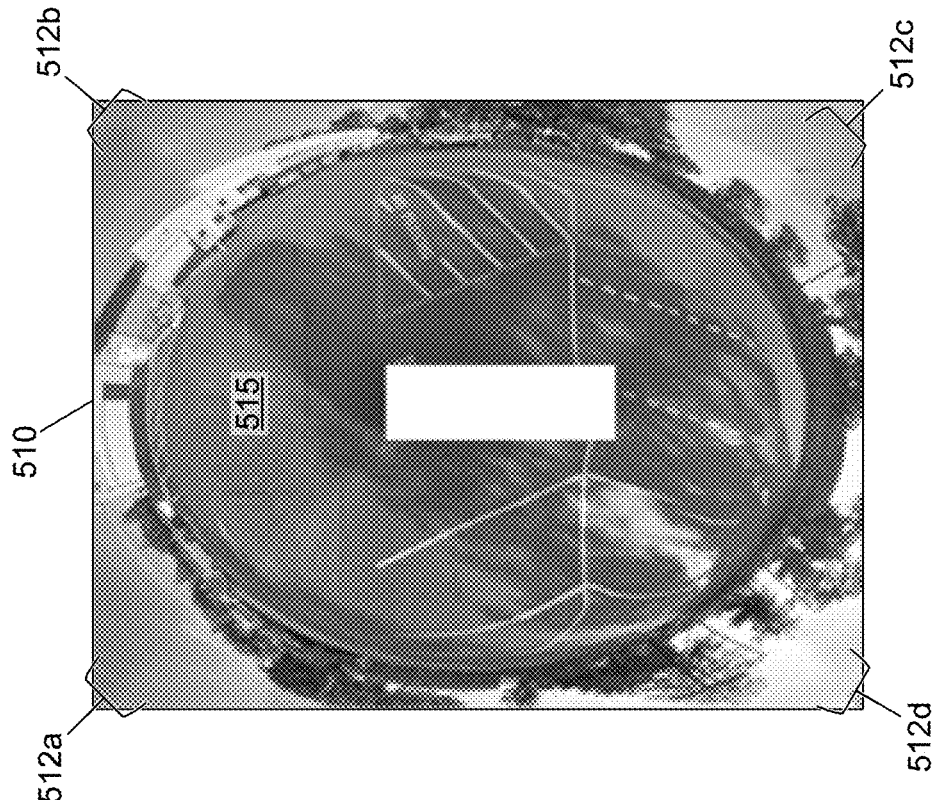
FIGURE 5

600

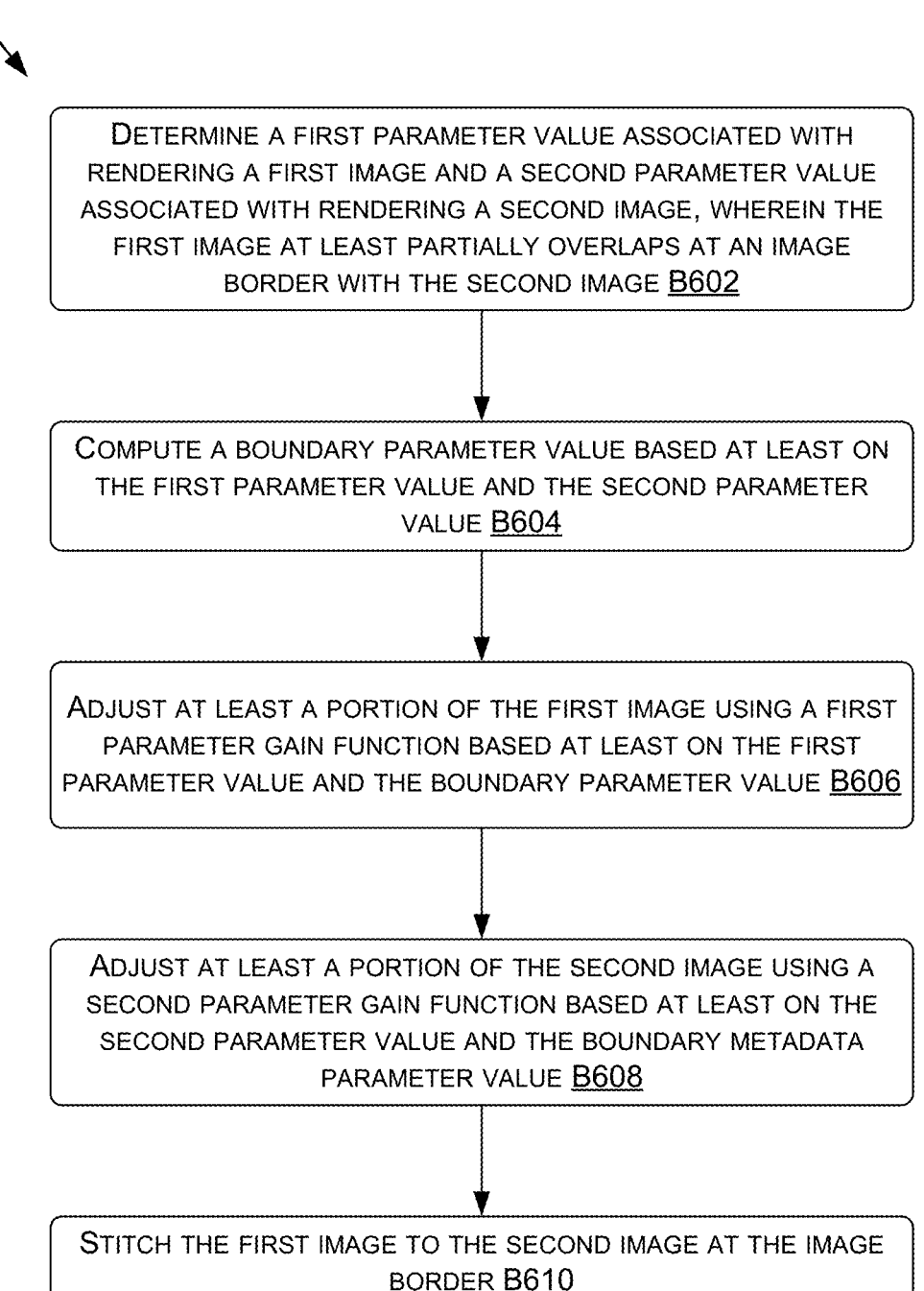

DETERMINE A FIRST PARAMETER VALUE ASSOCIATED WITH RENDERING A FIRST IMAGE AND A SECOND PARAMETER VALUE ASSOCIATED WITH RENDERING A SECOND IMAGE, WHEREIN THE FIRST IMAGE AT LEAST PARTIALLY OVERLAPS AT AN IMAGE BORDER WITH THE SECOND IMAGE B602

COMPUTE A BOUNDARY PARAMETER VALUE BASED AT LEAST ON THE FIRST PARAMETER VALUE AND THE SECOND PARAMETER VALUE B604

ADJUST AT LEAST A PORTION OF THE FIRST IMAGE USING A FIRST PARAMETER GAIN FUNCTION BASED AT LEAST ON THE FIRST PARAMETER VALUE AND THE BOUNDARY PARAMETER VALUE B606

ADJUST AT LEAST A PORTION OF THE SECOND IMAGE USING A SECOND PARAMETER GAIN FUNCTION BASED AT LEAST ON THE SECOND PARAMETER VALUE AND THE BOUNDARY METADATA PARAMETER VALUE B608

STITCH THE FIRST IMAGE TO THE SECOND IMAGE AT THE IMAGE BORDER B610

MEMORY
804

I/O COMPONENTS
814

CPU(s)
806

POWER SUPPLY
816

GPU(s)
808

PRESENTATION
COMPONENT(S)
818

COMM. INTERFACE
810

LOGIC UNIT(S)
820

I/O PORT(S)
812

802

900

IMAGE HARMONIZATION FOR IMAGE STITCHING SYSTEMS AND APPLICATIONS

BACKGROUND

Image stitching is a technique used in digital photography and computer graphics to create a panoramic or 360-degree surround-view image by combing multiple overlapping images into a single, seamless composite image. A stitching algorithm may be used to align common features or reference points appearing in two or more photos and blending pixel values at the image edges to create a smooth transition. The result is a single image having a greater field of view than the original images. In automotive applications, stitched images may be used to provide a vehicle driver with visual display images of views of the vehicle's surroundings, giving the driver an enhanced awareness of their surroundings, and supplementing and/or replacing views previously provided by vehicle mirrors.

SUMMARY

Embodiments of the present disclosure relate to image harmonization for image stitching systems and applications. Systems and methods are disclosed that preprocess images using metadata with respect to one or more rendering parameters, with the effect of blending those parameters at a border between images to facilitate a smooth render when those images are stitched together.

In contrast to conventional systems related to stitching technologies, embodiments of this disclosure, at least in part, provide an image signal processing (ISP) parameter harmonization function that inputs image-processing metadata parameters associated with a set of images to match and blend one or more of the rendering parameters across an overlapping border between images (a process referred to herein as harmonization) prior to applying those images to a stitching algorithm. Image-processing metadata may be used as parameters to control the rendering of sensor-captured image data within image frames. Rendering parameters applied to adjust an image captured by a sensor may be defined by image metadata such as, but not limited to, white balance temperature, global tone mapping (GTM), exposure time, brightness, contrast, gamma, hue, noise reduction, saturation, and/or sharpness. In some embodiments, rendering parameters may include lens distortion and/or lens shading correction parameters applied to compensate for optical characteristics of sensor hardware.

The scaling may be performed using a parameter gain function that inputs the initial values of the metadata parameter, as applied by the cameras that captured the first and signal images. For example, the ISP parameter harmonization function may compute a boundary metadata parameter value based on an average of a first metadata parameter value for the first image and a second metadata parameter value for the second image. Parameter gain functions may then be used for each image to gradually adjust the metadata parameter from a position near or at the image center (where the initial metadata parameter value applied remains unchanged)—to the boundary edge between the images (where the metadata parameter applied is the boundary metadata parameter value). As such, the pixels located along either side of the boundary edge where the images will be stitched will be adjusted using the same boundary metadata parameter value, where the metadata parameter value smoothly follows the parameter gain function. A discontinuity in rendering parameters is avoided at the border regions where the original images are blended together during stitching, substantially avoiding the appearance of corresponding artifacts in the resulting stitched image.

BRIEF DESCRIPTION OF THE DRAWINGS

The present systems and methods for metadata-based image harmonization for image stitching are described in detail below with reference to the attached drawing figures, wherein:

FIGS. 4 and 5 are diagrams that illustrate attenuation of metadata artifacts provided by metadata parameter harmonization of images to render a stitched image, in accordance with some embodiments of the present disclosure;

FIG. 6 is a flow diagram for a method for metadata harmonizing image stitching, in accordance with some embodiments of the present disclosure;

DETAILED DESCRIPTION

Figure 1:
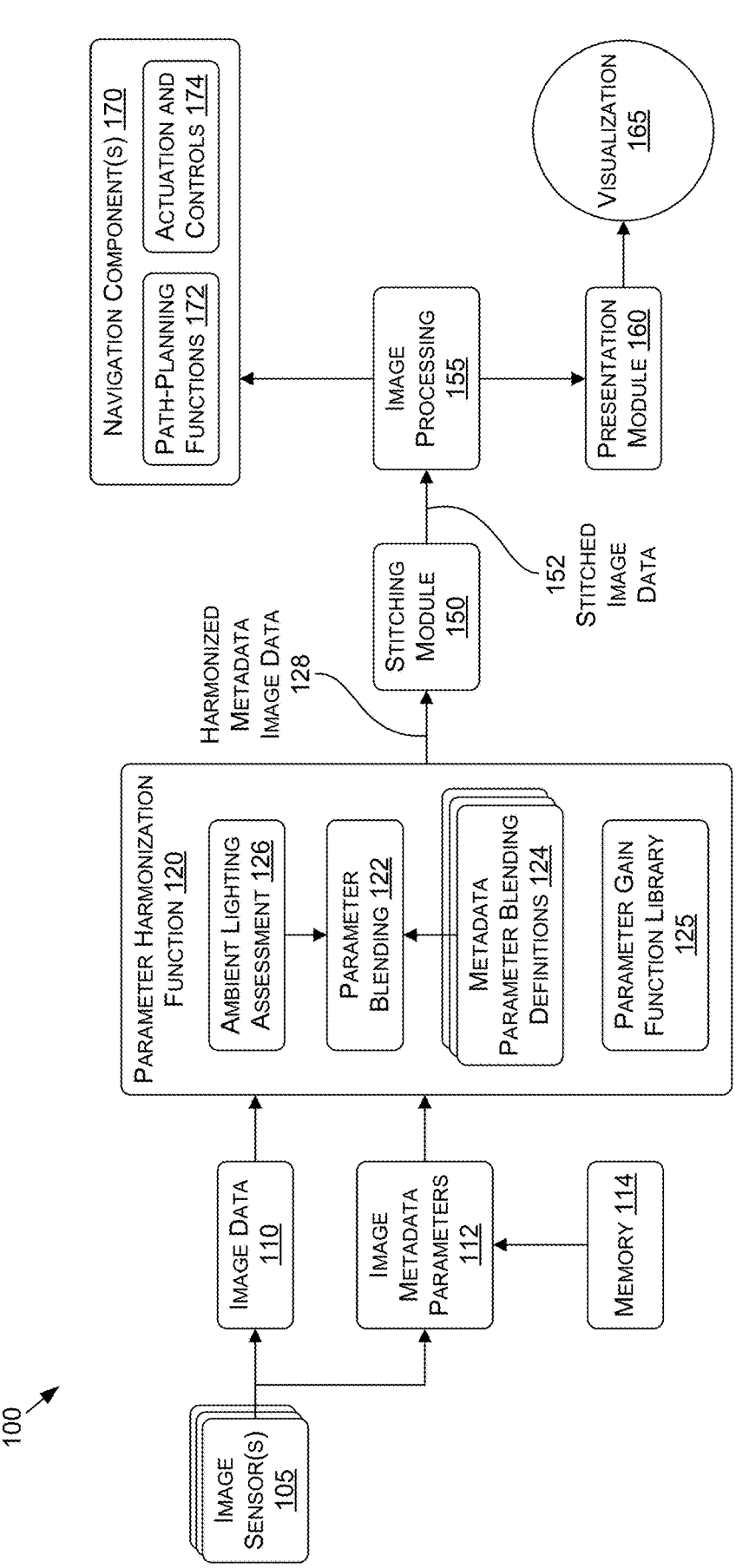
FIG. 1 is a data flow diagram for a metadata harmonizing image stitching system, in accordance with some embodiments of the present disclosure.

Systems and methods are disclosed related to image harmonization for image stitching. Although the present disclosure may be described with respect to an example autonomous or semi-autonomous vehicle or machine 700 (alternatively referred to herein as "vehicle 700" or "ego-machine 700," an example of which is described with respect to FIGS. 7A-7D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to image stitching of images around a vehicle, this is not intended to be limiting, and the systems and methods described herein may be used in augmented reality, virtual reality, mixed reality, robotics, security and surveillance, autonomous or semi-autonomous machine applications, and/or any other technology spaces where stitched images may be used.

The present disclosure relates to technologies for stitching together images in order to form a composite image of a scene. As discussed herein, systems and methods are provided that preprocess images with respect to one or more rendering parameters, with the effect of blending those parameters at a border between images to facilitate a smooth rendering when those images are stitched together. Image stitching is a technique used in digital photography and computer graphics to create a panoramic or 360-degree surround-view image by combing multiple overlapping images into a single, seamless composite image.

However, a problem may arise when the cameras that capture the original images apply different camera parameters to capture a scene. For example, two cameras that independently capture overlapping images of a scene at the same time may generate images having different white balance (color temperature), tone mapping, exposure, lens shading correction, color correction, noise reduction, sharpening, and/or other rendering parameters. While traditional image stitching may produce a coherent image, the resulting image may contain visible artifacts with respect to image luma, color, noise, and/or sharpness because of the discontinuity in rendering parameters at the border regions where the original images are blended together.

The artifacts appearing between images captured by different cameras often become more severe under different lighting conditions. For example, when an ego vehicle is driving into a garage at night, the lighting conditions inside the garage may be very different than outside the garage. As a result, the individual cameras of a set of surround-view cameras may respectively apply drastically different exposure, white balance, and/or other rendering parameters from other cameras in the same set. When an image taken from within a well-lit garage using bright-light condition parameters is stitched to an overlapping image taken of a less well-lit driveway using dim-light condition parameters, artifacts caused by the different lighting condition parameters will often clearly manifest themselves at the seams where the images are stitched. For example, pixels with green tinted artifacts may appear at the seam between two images that have substantially different white balance parameter settings. Such artifacts can have detrimental effects with respect to image quality assessments, visualization quality (e.g., user experience), and/or the accuracy of downstream processes that may use the stitched images. As an example, a stitched image depicting a rear-view scene displayed to the driver should ideally present the driver with the same general appearance they would see behind the car. Similarly, a side-view image providing a view into a blind spot should display the same general appearance that the driver would see if the driver was able to perceive the blind spot area. Rendering artifacts from the stitching process may present the driver with a distraction or cause confusion (e.g., a misimpression that the artifact might be associated with an unexpected object). Further, in some implementations, rendering artifacts from the stitching process may cause a downstream process that uses the stitched image, such as an artificial intelligence (AI)-based process, to misclassify elements in the scene, or have a lower confidence level in a prediction than it would have if the artifact were not present in the stitched image.

To attempt to address issues that arise when a set of different cameras use different rendering parameters as they capture images, some image stitching technologies select one camera from the set of cameras as the reference camera and the image from the reference camera as the reference image. With such stitching technologies, often referred to as global color transfer techniques, global color statistics (e.g., color channel mean and/or standard deviation) of images from each of the other cameras of the set are transformed to match the global color statistics of the reference image. However, there are several drawbacks to global color transfer-based techniques. For example, color transfer-based techniques are sensitive to the decision of which camera from the set of cameras is selected as the reference camera. That is, depending on the selection of reference cameras, the resulting stitched images may differ with respect to their general appearances. For example, if a front-view camera of an automobile is selected as the reference, it may capture a brighter scene than a rear-view camera. Global color transfer may be applied between left-view and right-view cameras that produce images that share an overlapping region with the front camera. However, the rear-view camera may not share an overlapping view with the front camera, and therefore either the left- or right-view camera images would be selected as reference for performing global color transfer for the rear-view camera. Because the left-view and right-view cameras may observe very different scenes with different lighting conditions, the left-view and right-view cameras may apply different rendering parameters to the images they capture (e.g., apply a different white balance color temperature). Their global color statistics may be correspondingly different so that the appearance of the adjusted image from the rear-view camera may be drastically different depending on whether the left-view or right-view camera is selected as reference. As such, when the front image, left image, rear image, and right image are stitched to form a 360-degree surround view, a substantial discontinuity of rendering parameters is possible at the seam between the rear-view image and either the right- or left-view image, producing a visible artifact along that seam in the stitched image.

Global color transfer techniques are also challenged when adjacent cameras observe different scenes because of spatial disparity or have an object prominently filling the area of overlap. For example, if a vehicle is parked between the fields of view for two adjacent cameras, then the color statistics transferred to the reference image may not be representative of the color statistics of the entire image. In some global color transfers, a segmentation of two camera images may be performed to find matching patches that appear in both camera images and select such a patch to define the color statistics to be transferred between images. However, the segmentation and matching algorithms may be sufficiently compute-intensive so as to not be able to render real-time visualizations for a real-time surround-view system.

In contrast to these existing stitching technologies, embodiments of this disclosure, at least in part, provide an image signal processing (ISP) parameter harmonization function that inputs image-processing metadata parameters associated with a set of images to match and blend one or more of the rendering parameters across an overlapping border between images (a process referred to herein as harmonization) prior to applying those images to a stitching algorithm. Image-processing metadata parameters control the rendering of sensor-captured image data within image frames. An image-processing metadata parameter may control rendering with respect to a rendering parameter that, for example, adjusts captured images for specific lighting conditions and/or camera characteristics. Rendering parameters applied to adjust an image captured by a sensor may be defined by image metadata such as, but not limited to, white balance temperature, global tone mapping (GTM), exposure time, brightness, contrast, gamma, hue, noise reduction, saturation and/or sharpness. In some embodiments, rendering parameters may include lens distortion and/or lens shading correction parameters applied to compensate for optical characteristics of sensor hardware.

Harmonization may be applied on a per-image-frame basis, where a metadata parameter as applied to pixels within a first image may, starting from a position at (or near) a center of the first image, be adjusted and scaled in the direction towards an image border with a second image. The scaling may be performed using a parameter gain function that inputs the initial values of the metadata parameter as applied by the cameras that captured the first and signal images. For example, for the first image, the ISP parameter harmonization function may compute a boundary metadata parameter value based on an average of a first metadata parameter value for the first image and a second metadata parameter value for the second image. The parameter gain function may then be used to gradually adjust the metadata parameter applied to the first image from the selected position near or at the image center (where the initial metadata parameter value applied remains unchanged) to the boundary edge between the images (where the metadata parameter applied is the boundary metadata parameter value). For the second image, the ISP parameter harmonization function uses the same boundary metadata parameter value (e.g., based on an average of a first metadata parameter value for the first image and a second metadata parameter value for the second image). A parameter gain function may be used to gradually adjust the metadata parameter applied to the second image from a position near or at the image center to the boundary edge between the images. As such, the pixels located along either side of the boundary edge where the images will be stitched will be adjusted using the same boundary metadata parameter value, where the metadata parameter value smoothly follows the parameter gain function. As a result, a discontinuity in rendering parameters is avoided at the border regions where the original images are blended together during stitching, substantially avoiding the appearance of corresponding artifacts in the resulting stitched image. Harmonization between neighboring images prior to stitching may be applied for a single metadata parameter or multiple metadata parameters.

In some embodiments, harmonization may be applied between an image and multiple other images with which it will be stitched. For example, a 360-degree surround-view image may be formed by stitching together four partially overlapping images captured by four cameras (e.g., a front, left, rear, and right camera). In that case, the left side of each image may respectively be harmonized with the image that will be stitched to its left, and the right side of each image may respectively be harmonized with the image that will be stitched to its right. When the images are stitched together, each image is harmonized across the seams formed with its neighboring images—thus avoiding rendering parameter discontinuities that amplify artifacts in the stitched images. A harmonization may be performed with respect to each border that an image has with an overlapping neighbor image. For example, harmonization may be performed with neighboring images to the left and/or right of an image, neighboring images above and/or below an image, or any combination thereof. In some embodiments, a set of metadata parameter harmonizations for an image may be applied either in sequence, and/or simultaneously by mathematically combining parameter gain functions and computing the resulting combined parameter gain adjustments.

As one example, parameter harmonization may be formed with respect to the white balance metadata parameter. Different light sources produce light that may have different color distribution so that the color of an object in a scene will appear differently, depending on the light source that is illuminating the object. An image captured in light with a higher color temperature may appear bluer, while an image captured in light with a lower color temperature may appear more yellow. White balance, also referred to as color temperature and measured in degrees Kelvin (K), is a metadata parameter that may be adjusted when capturing an image so that white objects appear white in the captured image. Auto white balance is a camera rendering parameter setting (usually turned on by default) where the camera senses the ambient lighting conditions and automatically adjusts the white balance so that the colors in a captured image look natural. The auto white balance of two different cameras capturing different but overlapping areas of a scene may therefore select and adjust the images they capture using different white balance color temperatures because factors such as lighting angles, shadows, glare, and/or the presence or absence of reflecting surfaces may cause each camera to assess the ambient lighting conditions differently. For example, although two cameras may simultaneously capture images that include the same red object, the red object may appear differently in one image than the other because the two cameras apply different white balance adjustments to their respective images.

White balance harmonization compensates for such a difference in the applied white balance between the two images so that the applied white balance metadata parameter is the same where the two images share an image boundary at an overlapping border, and a smooth transition in white balance is provided from the center of one image to the center of the other. The gradation in the white balance metadata parameter from the image center to the image boundary is a function of the parameter gain function. The parameter gain function may be implemented using a simple linear ramp function or more complex curves, such as an s-curve (e.g., a standard logistics function curve). The parameter gain function may be calibrated so that it has a unity gain value at or near the center of the image. For the image boundary, the parameter gain function is calibrated based on a function of the respective white balance parameters selected by each camera so that pixels at the image boundary in each image will be rendered using the same white balance color temperature. The gain at the image boundary between a first image and a second image may therefore be expressed as:

$$g_1 WB(W') = \frac{(WB_1 + WB_2)}{2WB_1}, \; g_2 WB(0) = \frac{(WB_1 + WB_2)}{2WB_2},$$

where $WB_1$ is the white balance temperature applied to image 1 by camera 1, $WB_2$ is the white balance temperature applied to image 2 by camera 2, W' is a position of the image boundary with respect to the frame of the first image, and 0 is the position of the image boundary with respect to the frame of the second image. The white balance gain at the image center of the first image and the second image is a unity gain that may be expressed as:

$$g_1 WB(\text{Width}/2) = 1, \quad g_2 WB(\text{Width}/2) = 1,$$

where "Width/2" designates the position of the image center for each image. For the first image, the white balance applied to pixels can be adjusted according to $g_1 WB(x) \times WB_1 = $ parameter gain function$_1(x) \times WB_1$, for x=Width/2 to W'. For the second image, the white balance applied to pixels would be adjusted according to $g_2 WB(x) \times WB_2 = $ parameter gain function$_2(x)$, for x=0 to Width/2. Note that the particular parameter gain functions used within each image may apply differently shaped curves.

As another example, parameter harmonization may be formed with respect to a global tone mapping (GTM) metadata parameter. Tone mapping may be used to map one set of colors to another set of colors, for example, to provide an appearance of high dynamic range (HDR) images from a source image that has a more limited dynamic range. As with white balance harmonization, GTM harmonization compensates for a difference in the applied GTM between the two images so that the GTM metadata parameter is the same where the two images share an image boundary at an overlapping border, and a smooth transition in GTM is provided from the center of one image to the center of the other. The gradation in the GTM metadata parameter from the image center to the image boundary is also adjusted as a function of a parameter gain function. For harmonizing GTM, the gain at the image boundary between a first image positioned to the right of a second image may therefore be expressed as:

$$g_1 GTM(W') = \frac{(LUT_1 GTM(pixelVal_1))}{pixelVal_1},$$

$$g_2 GTM(0) = \frac{(LUT_2 GTM(pixelVal_2))}{pixelVal_2},$$

where $LUT_1 GTM$ and $LUT_2 GTM$ are harmonized GTM 256 point lookup tables (LUT). $LUT_1 GTM$ is obtained by an interpolation between the original $GTM_{1orig}LUT$ applied to the image 1 by camera 1, and an averaged GTM LUT=f ($GTM_{1orig}LUT$, $GTM_{2orig}LUT$). $LUT_2 GTM$ is obtained by an interpolation between the original $GTM_{2orig}LUT$ applied to the image 2 by camera 2, and the averaged GTM LUT is derived as a function of $GTM_{1orig}LUT$ and $GTM_{2orig}LUT$. The GTM gain at the image center of the first image and the second image may be a unity gain that may be expressed as:

$$g_1 GTM(\text{Width}/2) = 1, \quad g_2 GTM(\text{Width}/2) = 1.$$

In this way, harmonization for different metadata parameters may be applied based on computing metadata parameter values that are common between images at the image border, and applying a parameter gain function within each image to smooth the application of the metadata parameters from positions within the images (e.g., the respective image centers) to the shared border. Once the desired set of metadata parameters are harmonized, the images may be applied to the image stitching algorithm. As mentioned above, in addition to white balance and GTM, other metadata parameters that may be harmonized using this process include, but are not limited to, parameters for exposure, lens shading correction, color correction, noise reduction, sharpening, color filter array (CFA) pattern, focal length correction, lens distortion correction (e.g., barrel distortion correction and pincushion distortion) and/or other rendering parameters that affect how an image is rendered. In some embodiments, a series of harmonizations may be applied to a set of images. While the order in which harmonizations are performed may affect the final overall appearance of the stitched image, the selection of which metadata parameters to harmonize and in what order may be selected based on the specific use case for which the stitched image is being generated.

Metadata parameters associated with each image may be communicated to the ISP parameter harmonization function in several ways. For example, metadata parameters that include rendering parameters selected by a camera can be communicated by the camera to the ISP parameter harmonization function as metadata embedding and/or carried with the image data for each captured image frame. In some embodiments, metadata parameters can be communicated by the camera to the ISP parameter harmonization function through a channel separate from channels carrying the image data (e.g., pixel color data). In some instances, one or more metadata parameters may represent static characteristics or settings associated with a camera that may not change with each image captured (e.g., a lens distortion correction and/or sensor or pixel size). Such metadata parameters may be stored to a memory and recalled as needed by the ISP parameter harmonization function rather than communicated by the camera to the ISP parameter harmonization function with each captured image.

As mentioned above, the parameter gain function can be implemented using any function that produces the desired gradation of metadata parameter blending. Possible parameter gain functions may include using a simple linear ramp function or functions that produce more complex and/or non-linear curves, such as a logistics function curve. The parameter gain function may be selected and/or adjusted on an image-by-image basis, based on the metadata parameter to be harmonized and/or individual lighting conditions affecting each image. For example, if two neighboring images have substantially different brightness levels, then the steepness or rate of change of the parameter gain function (e.g., the logistic: growth rate of a logistic function) can be adjusted to change more quickly to facilitate more seamless parameter blending. In low-light conditions, a more gradual rate of smoothing of white balance across an image may address parameter discontinuity at the image border better than a steeper smoothing rate. In some embodiments, parameter gain function curves may be selected by the ISP parameter harmonization function from a library of predefined curves. In some embodiments, parameter gain function curves may be dynamically computed by the ISP parameter harmonization function.

Although examples of harmonizing parameters have been discussed in the context of stitching together images from a set of cameras to produce 360-degree surround images, harmonization may be applied to other camera array configurations for other image stitching use cases. For example, a plurality of cameras may be arranged as a hemispherical camera array. Such a camera array may be used by an aerial drone to view the ground below, or the sky overhead, and captured images stitched together to generate a contiguous, wide-angle, fisheye type image for visualization, navigation, and/or other purposes. It should be appreciated that the embodiments described herein may be used in the context of vehicles such as automobiles, trucks, trains, aircraft, space-craft, and/or boat, but may be extended to other machinery such as remote-operated devices (e.g., robots and drones), industrial and/or construction machinery (e.g., lifts and cranes), and/or any other application where images may be stitched together to generate a composite image.

With reference to FIG. 1, FIG. 1 is an example data flow diagram for a metadata harmonizing image stitching system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or func-tionalities to those of example autonomous vehicle 700 of FIGS. 7A-7D, example computing device 800 of FIG. 8, and/or example data center 900 of FIG. 9.

As shown in FIG. 1, metadata harmonizing image stitch-ing system 100 may comprise a parameter harmonization function 120 that generates stitched image data 152 (e.g., stitched images) of a three-dimensional (3D) environment (e.g., around an ego-object, such as a vehicle) based on image data 110 captured by one or more image sensors 105 and image metadata parameters 112 associated with the image data 110. Image data 110 may include image frames for a plurality of images. Image sensor(s) 105 may include, for example, RGB, infrared (IR) and/or RGB-IR cameras, and/or other cameras, such as cameras described with respect to the vehicle 700 of FIGS. 7A-7D. Image data 110 is not limited to any particular color space. For example, image data 110 may include images represented using a color space such as, but not limited to YUV, RGB, CIELAB (L*a*b*) or other color space. The image sensor(s) 105 may include one or more cameras of an ego-object or ego-actor, such as stereo camera(s) 768, wide-view camera(s) 770 (e.g., fisheye cameras), infrared camera(s) 772, surround camera(s) 774 (e.g., 3600 cameras), and/or long-range and/ or mid-range camera(s) 798 of the autonomous vehicle 700 of FIGS. 7A-7D. The image sensor(s) 105 may be used to generate the image data 110 of the 3D environment around the ego-object or ego-actor and one or more of the image metadata parameters 112. In embodiments where multiple image sensor(s) 105 are used, the multiple image sensor(s) 105 may view a common region of the 3D environment with an overlapping portion of their respective fields of view such that the image data 110 (e.g., images) from different image sensors 105 represent at least partially overlapping images of the 3D environment.

Image metadata parameters 112 are parameters that may be used to control the rendering of images within image frames of the image data 110. An image-processing meta-data parameter of the image metadata parameters 112 may control rendering with respect to a rendering parameter that, for example, adjusts images captured by the image sensor(s) 105 for specific lighting conditions and/or camera charac-teristics. Rendering parameters included within the image metadata parameters 112 associated with a set of image data 110 may include parameters such as, but not limited to, white balance temperature, global tone mapping (GTM), exposure time, brightness, contrast, gamma, hue, noise reduction, saturation, and/or sharpness. In some embodi-ments, rendering parameters may include lens distortion and/or lens shading correction parameters applied to com-pensate for optical characteristics of image sensor(s) 105 hardware.

Image metadata parameters 112 associated with the indi-vidual images represented by image data 110 may be com-municated to the parameter harmonization function 120 in several ways. For example, metadata parameters that include rendering parameters selected by image sensor(s) 105 can be communicated by the image sensor(s) 105 to the parameter harmonization function 120 as metadata embedding in and/ or carried with the image data 110 for each captured image frame. In some embodiments, one or more of image meta-data parameters 112 can be communicated by the image sensor(s) 105 to the parameter harmonization function 120 through a channel separate from channels carrying the image data 110. In some instances, one or more metadata param-eters may represent static characteristics or settings associ-ated with the image sensor(s) 105 that may not change with each image captured (e.g., a lens distortion correction and/or sensor or pixel size). Such metadata parameters may be stored to a memory 114 and recalled as needed by the parameter harmonization function 120 rather than, or in addition to, being communicated by the image sensor(s) 105 to the parameter harmonization function 120 with the image data 110.

In metadata harmonizing image stitching system 100, a parameter harmonization function 120 may process the image data 110 and corresponding image metadata param-eters 112 as described herein to generate a metadata param-eter harmonized version of the image data 110 (shown as harmonized metadata image data 128). In some embodi-ments, harmonized metadata image data 128 comprises a plurality of image frames from the image data 110 that have been harmonized by the parameter harmonization function 120 with respect to at least one metadata parameter as described herein. A stitching module 150 may stitch the frames of harmonized metadata image data 128 into stitched image data 152 (e.g., a 360° surround-view image, wide-angle image, fisheye-view image, and/or a panoramic image) using any stitching technique. In some embodiments, the stitched image data 152 may be further processed using image processing 155 based on one or more image process-ing techniques. For example, in some embodiments, image processing 155 may harmonize color, apply image sharpen-ing, noise reduction, gamma correction, exposure compen-sation, and/or apply other filters and/or adjustments across portions of the stitched image data 152. In some embodi-ments, the image processing 155 may perform color harmo-nization and/or other image processing such as described with respect to the color harmonizer disclosed in U.S. patent application Ser. No. 17/959,934 titled "IMAGE STITCH-ING WITH COLOR HARMONIZATION FOR SUR-ROUND VIEW SYSTEMS AND APPLICATIONS," filed on Oct. 4, 2022, which is incorporated herein by reference in its entirety.

A presentation module 160 may cause presentation of a visualization 165 of at least a portion of the stitched image data 152 (e.g., on a monitor visible to an occupant or operator of the ego-object or ego-actor). In some embodiments, the presentation module 160 projects the stitched image data 152, or a portion thereof, onto a 3D representation of the 3D environment (e.g., a 3D bowl that models the 3D environment), renders a view of the projected stitched image data 152 from the perspective of a virtual camera, and/or causes presentation of the rendered view as the visualization 165.

In some embodiments, the stitched image data 152 may be used by one or more downstream navigation components 170 of an ego-machine, such as the controller(s) 736 discussed below. The downstream navigation components 170, for example, may implement functions such as object avoidance navigation functions and/or a world model manager, a path planner, a control component, a localization component, an obstacle avoidance component, an actuation component, and/or the like, to perform operations for controlling the ego-machine through an environment. In some embodiments, downstream navigation components 170 may include one or more deep neural networks (DNNs) that generate one or more predictions and/or inferences about the 3D environment based at least on the stitched image data 152.

For some embodiments, the downstream navigation components 170 may include at least one or more path-planning functions 172 (such as path-planning functions for ego-machine 700) and/or actuation and controls 174 (such as the steering or brake actuators or another controller discussed herein with respect to ego-machine 700). For example, the path-planning functions 172 may include a configuration space manager, a freespace manager, a reachability manager, and a path evaluator. The configuration space manager may manage a pose configuration space, which represents poses comprising positions and orientations of the ego-machine in its environment. The freespace manager and the reachability manager may process the pose configuration space to determine one or more paths for maneuvering from a current pose to a target pose in the pose configuration space based at least in part on the stitched image data 152. The path evaluator may identify one or more proposed or potential paths for the vehicle based at least on the assessment by the reachability manager.

To generate the harmonized metadata image data 128 from the image data 110, the parameter harmonization function 120 includes parameter blending 122 to blend the application of one or more of the image metadata parameters 112 across the images represented by image data 110. The parameter blending 122 may apply blending of one or more of the image metadata parameters 112 within each image frame of the image data 110 based on one or more metadata parameter blending definitions 124 that define, for example, algorithms to compute boundary metadata parameter values and/or the selection and/or characteristics of the parameter gain functions applied to perform parameter harmonization between images represented in the image data 110 in preparation for stitching of the images by the stitching module 150. For example, in some embodiments, the metadata parameter blending definitions 124 may include definitions for performing parameter harmonization with respect to one or more of, but not limited to, white balance temperature, global tone mapping (GTM), exposure time, brightness, contrast, gamma, hue, noise reduction, saturation, sharpness, lens distortion, and/or lens shading correction parameters. In some embodiments, the parameter harmonization function 120 may select (e.g., based on a user input and/or input from another system of vehicle 700) which metadata parameters of the image metadata parameters 112 are to be processed for parameter harmonization and control the parameter blending 122 to perform parameter harmonization of the image data 110 using the corresponding definitions from the metadata parameter blending definitions 124.

Figure 2:
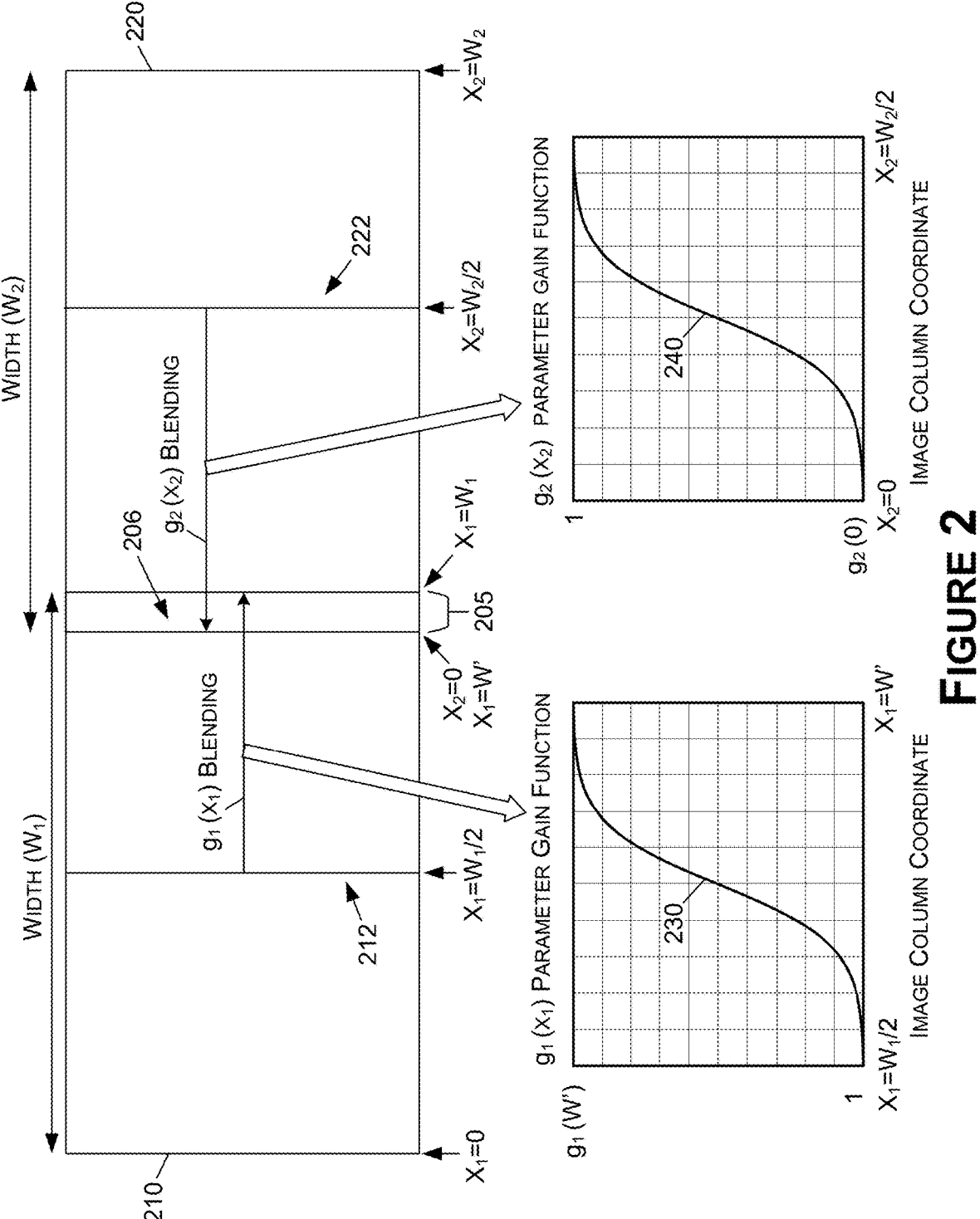
FIG. 2 is a diagram that illustrates metadata harmonization between two images, in accordance with some embodiments of the present disclosure.

In some embodiments, the parameter harmonization function 120 executes parameter blending 122 to apply parameter harmonization on a per-image basis to the frames represented by the image data 110. For example, referring now to FIG. 2, FIG. 2 illustrates an example of parameter harmonization between a first image 210 and a second image 220 represented by the image data 110. The two images share an overlapping region 205 that defines an overlapping image boundary 206 between the first image 210 and the second image 220. In this example, parameter harmonization between the first image 210 and the second image 220 is applied across the image boundary 206 between the center of the first image 210 (shown at 212) and the center of the second image 220 (shown at 222).

Given a first image 210 having a width of $W_1$ pixels, and a second image 220 having a width of $W_2$ pixels, then the center of first image 210 may be defined as pixel column $W_1/2$, and the center of second image 220 may be defined as pixel column $W_2/2$. In some embodiments, the image boundary 206 with respect to the first image 210 may be defined at pixel column W', where W' is $<W_1$, an amount that accounts for the overlap between the first image 210 and the second image 220. The image boundary 206 with respect to the second image 220 may be defined at pixel column 0 of the second image 220, which may represent the column of second image 220 that will align with pixel column W' at the image boundary 206.

To implement parameter harmonization between the first image 210 and the second image 220 with respect to a selected metadata parameter, the parameter blending 122 may compute a boundary metadata parameter value based on an algorithm defined by the metadata parameter blending definitions 124 for that selected metadata parameter. The boundary metadata parameter value may be computed based on an average of a first metadata parameter value for the first image 210 and a second metadata parameter value for the second image 220. For example, for an implementation where the selected metadata parameter for parameter harmonization is white balance, the parameter blending 122 may input a first white balance parameter, $WB_1$, from the image metadata parameters 112 that indicates the white balance temperature that was applied to the first image 210 when it was captured, and a second white balance parameter, $WB_2$, from the image metadata parameters 112 that indicates the white balance temperature that was applied to the second image 220 when it was captured. Based on the seam or overlap region location, the boundary metadata parameter may be computed using a weighted value of a first metadata parameter value for the first image 210 and a second metadata parameter value for the second image 220. For example, if the seam or overlap region location is closer to the first image, then boundary metadata parameter has more weight on metadata from the first image than from the second image. The seam and overlap region can be any shape, not limited to a straight line, in which case individual rows may apply a differently optimized blending curve. In some embodiments, each row may apply a differently optimized blending curve $g_1(x)$ and $g_2(x)$ to account for camera lens radial distortion or parameter blending in a radial direction. While FIG. 2 illustrates an example of a horizontal overlapping between images case, this example is not intended to be limiting. For example, an overlap between two images can be horizontal, vertical, or in both horizontal and vertical directions.

A parameter gain function for the first image 210 (shown at 230) may be calibrated to have a unitary gain (a gain of one) at or near the image center (e.g., at pixel column $W_1/2$) so that the white balance for this position in the first image is $WB_1$. A parameter gain function for the second image 220 (shown at 240) may be calibrated to have a unitary gain (a gain of one) at or near the image center (e.g., at pixel column $W_2/2$) so that the white balance for this position in the first image is $WB_2$. A boundary metadata parameter value for the first image 210 may be computed based on an average of $WB_1$ and $WB_2$, such as $$g_1 WB(W') = \frac{(WB_1 + WB_2)}{2WB_1},$$

where $g_1 WB$ is the gain that the parameter gain function for the first image 210 applies to the white balance $WB_1$ at column W' of the first image 210. A boundary metadata parameter value for the second image 220 may be computed based on an average of $WB_1$ and $WB_2$, such as $$g_2 WB(0) = \frac{(WB_1 + WB_2)}{2WB_2},$$

where $g_2 WB$ is the gain that the parameter gain function for the second image 220 applies to the white balance $WB_2$ at column zero of the second image 220. The resulting $g_1 WB$ (W') and $g_2 WB(0)$ boundary metadata parameter values applied respectively to the first image 210 and the second image 220 at the overlapping image boundary 206 adjust the respective images to be rendered using the same white balance color temperature within the overlapping region 205.

Moreover, the parameter gain function 230 for the first image 210 produces a gradation in the white balance color temperature by applying the gain of one to the white balance at the image center 212, the gain of $g_1 WB(W')$ at the image boundary 206, and a smooth gradation in the white balance metadata parameter between the image center 212 and the image boundary 206 that follows the parameter gain function 230. In the same way, the parameter gain function 240 for the second image 220 produces a gradation in the white balance color temperature by applying the gain of one to the white balance at the image center 222, the gain of $g_2 WB(0)$ at the image boundary 206, and a smooth gradation in the white balance metadata parameter between the image center 222 and the image boundary 206 that follows the parameter gain function 240.

As such, the pixels located along either side of the image boundary 206 where the first image 210 and second image 220 will be stitched will be adjusted using the same boundary metadata parameter value, where the metadata parameter value smoothly follows the parameter gain function. A discontinuity in rendering parameters is avoided at the image boundary 206 where the images are blended together during stitching, substantially avoiding the appearance of corresponding artifacts in the resulting stitched image data 152.

The particular parameter gain functions and/or algorithms for computing the boundary metadata parameter value may differ depending on the metadata parameter for which parameter harmonization is being applied, and/or may be specified by a corresponding metadata parameter blending definition selected by the parameter harmonization function 120 from the metadata parameter blending definitions 124. For example, for a parameter harmonization applied with respect to a global tone mapping (GTM) metadata parameter, the metadata parameter blending definitions 124 may provide the algorithms for computing boundary metadata parameter values based on the $LUT_1 GTM$ and $LUT_2 GTM$ harmonized GTM 256 point lookup tables (LUT), as previously described herein.

A parameter gain function specified by the metadata parameter blending definitions 124 and/or applied by parameter blending 122 can be implemented using any function that produces the desired gradation of metadata parameter blending. Possible parameter gain functions may include, for example, a linear ramp function and/or functions that produce more complex and/or non-linear curves, such as a logistics function curve. In some embodiments, a parameter gain function applied by the parameter blending 122 may be selected and/or adjusted on an image-by-image basis, based on the metadata parameter to be harmonized and/or the individual lighting conditions affecting each image. For example, in some embodiments, the parameter harmonization function 120 may perform an ambient lighting assessment 126 on the images represented by the image data 110. If two neighboring images have substantially different brightness levels, then the parameter blending 122 may adjust the steepness or rate of change of the parameter gain function (e.g., the logistic growth rate of a logistic function) to change the applied gain more quickly to facilitate more seamless parameter blending. In low-light conditions, the parameter blending 122 may adjust the steepness or rate of change of the parameter gain function for a more gradual rate smoothing. In some embodiments, parameter gain function curves may be selected by the parameter harmonization function 120 from a parameter gain function library 125 that includes predefined curves for harmonizing different metadata parameters and/or for harmonizing based on different ambient lighting conditions.

Figure 3:
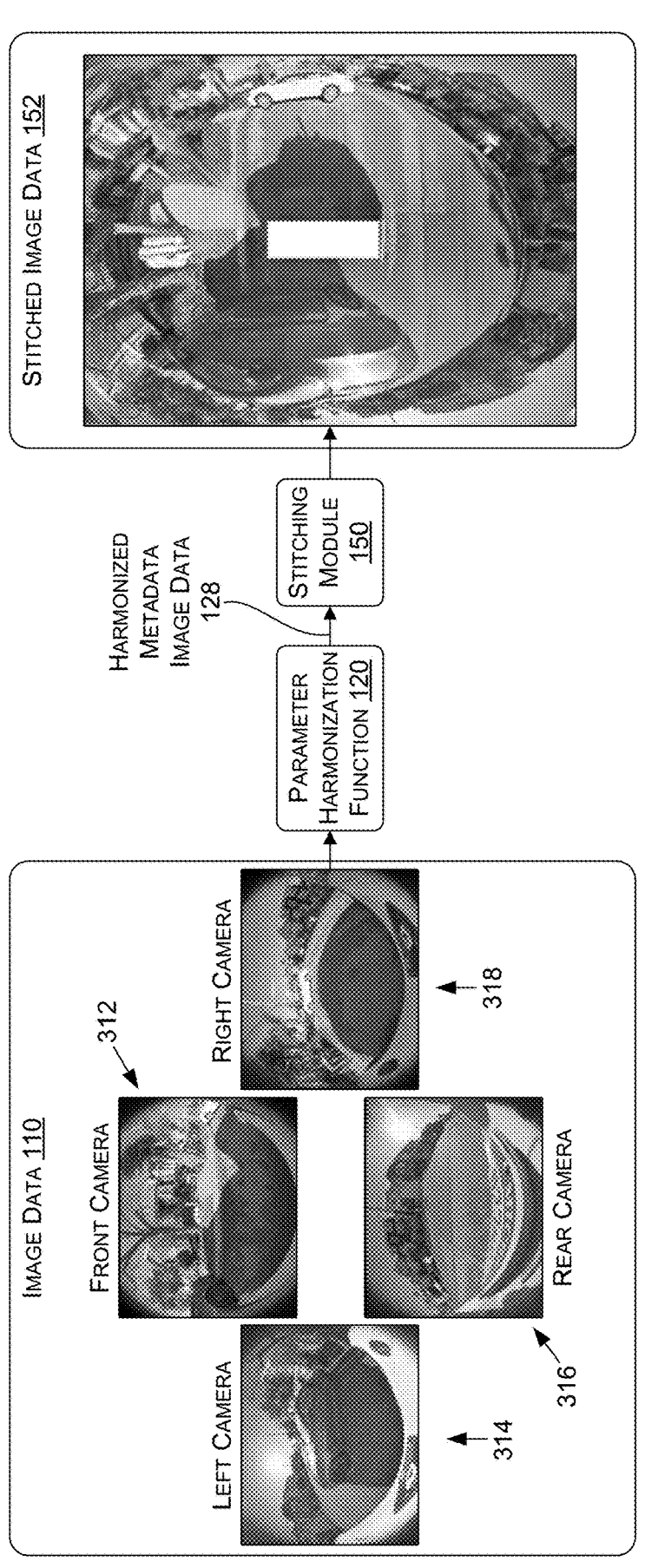
FIG. 3 is a diagram that illustrates metadata parameter harmonization of images to render a stitched image, in accordance with some embodiments of the present disclosure.

Referring now to FIG. 3, FIG. 3 illustrates parameter harmonization applied to a set of images to render a stitched image, such as a 360-degree surround-view image, for example. As shown in FIG. 3, a 360-degree surround-view image may be formed from image data 110 representing four partially overlapping images captured by four cameras: a front image 312 captured by a front camera, a left image 314 captured by a left camera, a rear image 316 captured by a rear camera, and a right image 318 captured by a right camera. In this example, parameter harmonization function 120 may apply parameter blending 122 to harmonize the right side of each image with the image that will be stitched to its right, such as is described with respect to the first image 210 in FIG. 2. Similarly, parameter harmonization function 120 may apply parameter blending 122 to harmonize the left side of each image with the image that will be stitched to its left, such as is described with respect to the second image 220 in FIG. 2. The parameter harmonization function 120 may output the resulting harmonized metadata image data 128 to the stitching module 150. When the harmonized images from the harmonized metadata image data 128 are stitched together, each image is harmonized across the seams formed with its neighboring images—thus avoiding rendering parameter discontinuities that amplify artifacts in the stitched images. Such metadata parameter harmonization may be performed with respect to each border that an image has with an overlapping neighbor image. For example, metadata parameter harmonization such as that illustrated in FIG. 3 may be performed with neighboring images to the left and/or right of an image, neighboring images above and/or below an image, or any combination thereof. In some embodiments, a set of metadata parameter harmonizations for an image may be applied either in sequence and/or simultaneously by mathematically combining parameter gain functions and computing the resulting combined parameter gain adjustments.

Figure 4:
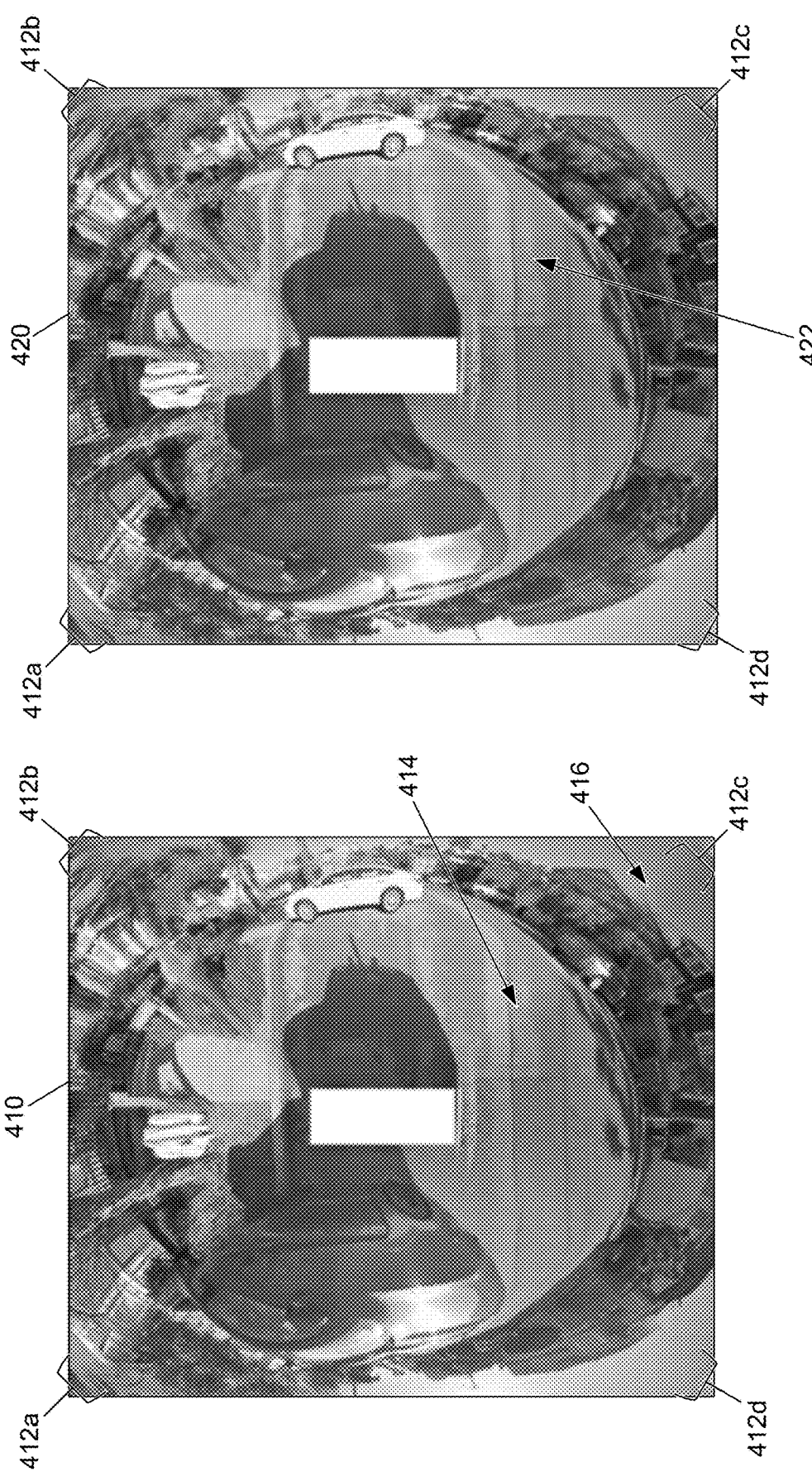

FIGS. 4 and 5 are each illustrations of example metadata parameter harmonizations applied to image data 110 representing four overlapping images to produce stitched image data 152 representing a 360-degree surround-view image.

In FIG. 4, image 410 illustrates the stitching of four overlapping images where metadata parameter harmonization has not been applied prior to stitching in order to produce a 360-degree surround-view image. In contrast, image 420 illustrates the stitching of the same four overlapping images where metadata parameter harmonization (in particular, white balance harmonization and GTM harmonization) has been applied prior to stitching in order to produce a 360-degree surround-view image. In image 410, visual artifacts 412a, 412b, 412c, and 412d are observable at the image boundaries between stitched images. For example, at visual artifact 412c a discontinuity is observable across the image boundaries both in the rendering of the parking lot 414 and the sky 416. In image 420 where white balance harmonization and GTM harmonization were applied to image data 110 prior to stitching, the visual artifact 412c, which would have appeared at 422, is substantially attenuated, and the images of the parking lot 414 and the sky 416 regions in image 420 appear relatively smooth in appearance.

In FIG. 5, image 510 illustrates the stitching of four overlapping images where metadata parameter harmonization has not been applied prior to stitching in order to produce a 360-degree surround-view image. In contrast, image 520 illustrates the stitching of the same four overlapping images where metadata parameter harmonization (in particular, white balance harmonization and GTM harmonization) has been applied prior to stitching in order to produce a 360-degree surround-view image. In image 510, visual artifacts 512a, 512b, 512c, and 512d are observable at the image boundaries between stitched images. For example, at visual artifacts 512a, 512b, and 512c, a discontinuity is observable across the image boundaries in the rendering of a parking lot 515 that is difficult to discern from the images of shadows legitimately rendered in the image 510. In image 520 where white balance harmonization and GTM harmonization were applied to image data 110 prior to stitching, the visual artifacts 512a, 512b, 512c, and 512d are each substantially attenuated with respect to the rendering of the parking lot 515.

In both of the examples of metadata parameter harmonization in FIGS. 4 and 5, the discontinuity in rendering parameters is avoided at the border regions where the original images are blended together during stitching, substantially avoiding the appearance of corresponding artifacts in the resulting stitched image.

Now referring to FIG. 6, FIG. 6 is a flow diagram showing a method 600 for metadata harmonizing-based image stitching, in accordance with some embodiments of the present disclosure. It should be understood that the features and elements described herein with respect to the method 600 of FIG. 6 may be used in conjunction with, in combination with, or substituted for elements of any of the other embodiments discussed herein and vice versa. Further, it should be understood that the functions, structures, and other descriptions of elements for embodiments described in FIG. 6 may apply to like or similarly named or described elements across any of the figures and/or embodiments described herein and vice versa.

Each block of method 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 600 is described, by way of example, with respect to the metadata harmonizing image stitching system 100 of FIG. 1. However, these methods may additionally or alternatively be executed by any one system, or any combination of systems, including, but not limited to, those described herein.

As discussed herein in greater detail, the method may include stitching a first image to a second image that at least partially overlaps with the first image at an image border, the stitching being based at least on adjusting the first image by blending a metadata parameter of the first image from a first value of the metadata parameter at a first position within the first image to a second value of the metadata parameter at a second position at the image border, wherein the second value is computed based at least on the first value of the metadata parameter and a third value of the metadata parameter associated with the second image.

Method 600, at block B602, includes determining a first metadata parameter value associated with rendering a first image and a second metadata parameter value associated with rendering a second image, wherein the first image at least partially overlaps at an image border with the second image. The first metadata parameter value and the second metadata parameter value may be associated with a rendering parameter such as, but not limited to, white balance, tone mapping, exposure time, brightness, contrast, gamma, hue, noise reduction, saturation, sharpness, color filter array (CFA) pattern, lens shading correction, lens distortion correction, focal length correction, barrel distortion correction, or pincushion distortion. In some embodiments, the first metadata parameter value and/or the second metadata parameter may be based on metadata communicated with the first image. For example, metadata parameters that include rendering parameters selected by image sensors can be communicated by the image sensor to the parameter harmonization function as metadata embedding in and/or carried with the image data for each captured image frame of the image data. In some embodiments, one or more of image metadata parameters can be communicated by the image sensor(s) to the parameter harmonization function through a channel separate from channels carrying the image data.

The first image may be captured by a first camera, and the second image may be captured by a second camera having an overlapping field of view with the first camera. In some embodiments, the first metadata parameter value and/or the second metadata parameter may be based on metadata associated with a characteristic of the respective first camera or second camera that captured the first image or second image. As such, in some instances, one or more metadata parameters may represent static characteristics or settings associated with the image sensor(s) that may not change with each image captured (e.g., a lens distortion correction and/or sensor or pixel size). Such metadata parameters may be stored to a memory and recalled as needed by the parameter harmonization function rather than, or in addition to, being communicated by the image sensor(s) to the parameter harmonization function with the image data.

Method 600, at block B604, includes computing a boundary metadata parameter value based at least on the first metadata parameter value and the second metadata parameter value. In some embodiments, the boundary metadata parameter value may be computed based on an average computed using the first metadata parameter value and the second metadata parameter value. To implement parameter harmonization between the first image and the second image with respect to a particular metadata parameter, a parameter blending function may compute a boundary metadata parameter value based on an algorithm defined by metadata parameter blending definitions for that metadata parameter. The boundary metadata parameter value may be computed based on an average of a first metadata parameter value for the first image and a second metadata parameter value for the second image, such as is described herein with respect to FIGS. 1 and 2. For example, for an implementation where the selected metadata parameter for parameter harmonization is white balance, the parameter blending may input a first white balance parameter, $WB_1$ from the image metadata parameters, which indicates the white balance temperature that was applied to the first image when it was captured, and a second white balance parameter, $WB_2$ from the image metadata parameters, which indicates the white balance temperature that was applied to the second image when it was captured.

Method 600, at block B606, includes adjusting at least a portion of the first image using a first parameter gain function based at least on the first metadata parameter value and the boundary metadata parameter value. The first parameter gain function may comprise, for example, a linear function, a non-linear curve function, an s-curve function, or a logistic curve function. Method 600, at block B608, includes adjusting at least a portion of the second image using a second parameter gain function based at least on the second metadata parameter value and the boundary metadata parameter value. The second parameter gain function may comprise, for example, a linear function, a non-linear curve function, an s-curve function, or a logistic curve function. The parameter gain function may be used to gradually adjust the metadata parameter applied to the images from a position near, or at, the image center (where the initial metadata parameter value applied remains unchanged—e.g., a gain of one) to the boundary edge between the images (where the metadata parameter applied is the boundary metadata parameter value). As such, the pixels located along either side of the boundary edge where the images will be stitched will be adjusted using the same boundary metadata parameter value, where the metadata parameter value smoothly follows the parameter gain function. As a result, a discontinuity in rendering parameters is avoided at the border regions where the original images are blended together during stitching, substantially avoiding the appearance of corresponding artifacts in the resulting stitched image. Harmonization between neighboring images prior to stitching may be applied for a single metadata parameter or multiple metadata parameters.

In some embodiments, at least one of the first parameter gain function and the second parameter gain function may be adjusted based on ambient lighting condition data from a sensor. For example, in some embodiments, the parameter harmonization function may perform an ambient lighting assessment on the images represented by the image data. If two neighboring images have substantially different brightness levels, then the parameter blending may adjust the steepness or rate of change of the parameter gain function (e.g., the logistic growth rate of a logistic function) to change the applied gain more quickly to facilitate more seamless parameter blending. In low-light conditions, the parameter blending may adjust the steepness or rate of change of the parameter gain function for a more gradual rate smoothing. In some embodiments, parameter gain function curves may be selected by the parameter harmonization function from a parameter gain function library that includes predefined curves for harmonizing different metadata parameters and/or for harmonizing based on different ambient lighting conditions.

Method 600, at block B610, includes stitching the first image to the second image at the image border. The second image may comprise, for example, a surround-view stitched image based at least on the first image and the second image, a fisheye-view stitched image based at least on the first image and the second image, and/or a panoramic-view stitched image based at least on the first image and the second image. In some embodiments, stitching may include stitching the first image to the second image based on an overlapping image border between the first image and the second image, and/or stitch the first image to a third image based on an overlapping image border between the first image and the third image. In some embodiments, a stitching module may stitch the frames of harmonized metadata image data into stitched image data (e.g., a 360° surround-view image, wide-angle image, fisheye-view image, and/or a panoramic image) using any stitching technique. In some embodiments, the stitched image data may be further processed using image processing based on one or more image processing techniques.

A presentation module 160 may cause presentation of a visualization 165 of at least a portion of the stitched image data 152 (e.g., on a monitor visible to an occupant or operator of the ego-object or ego-actor). In some embodiments, the presentation module 160 projects the stitched image data 152, or a portion thereof, onto a 3D representation of the 3D environment (e.g., a 3D bowl that models the 3D environment), renders a view of the projected stitched image data 152 from the perspective of a virtual camera, and/or causes presentation of the rendered view as the visualization 165. The stitched image data 152 may also, or instead, be used by one or more downstream navigation components of an ego-machine, such as the controller(s) 736 discussed below. The downstream navigation components, for example, may implement functions such as object avoidance navigation functions and/or a world model manager, a path planner, a control component, a localization component, an obstacle avoidance component, an actuation component, and/or the like, to perform operations for controlling the ego-machine through an environment. In some embodiments, downstream navigation components may include one or more deep neural networks (DNNs) that generate one or more predictions and/or inferences about the 3D environment based at least on the stitched image data.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, generative AI, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models—such as one or more large language models (LLMs), systems for performing light transport simulation, systems for performing collaborative content creation for 3D assets, systems implemented at least partially using cloud computing resources, and/or other types of systems.

Example Autonomous Vehicle

Figure 7A:
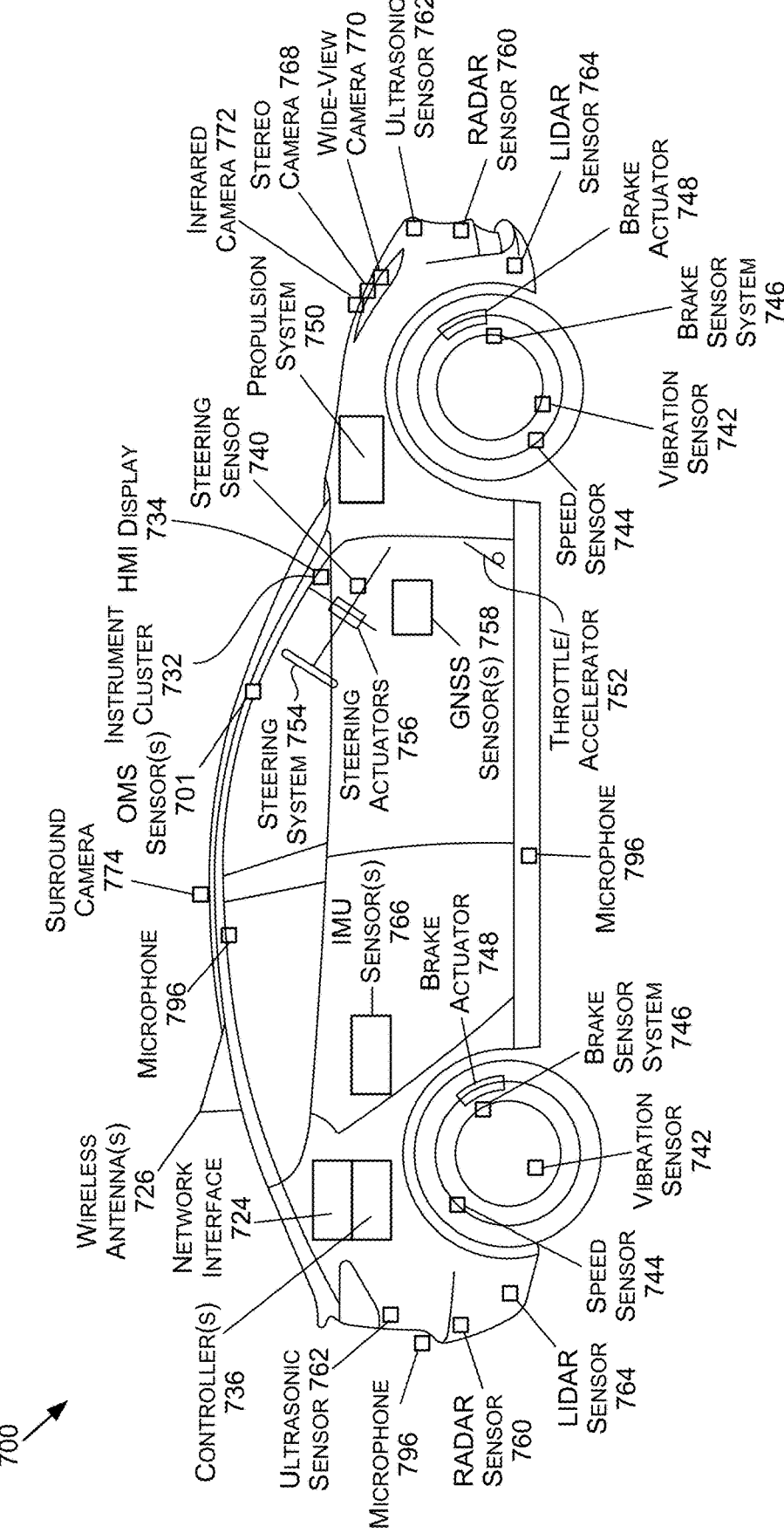
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. The vehicle 700 may be capable of functionality in accordance with one or more of Level 1-Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof. In some embodiments, controller(s) 736 may control one or more operations of one or more components and/or systems of the vehicle 700 describe herein based on the stitched image data 152.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), one or more occupant monitoring system (OMS) sensor(s) 701 (e.g., one or more interior cameras), and/or other sensor types. In some embodiments, one or more aspects of the parameter harmonization function 120 and/or stitching module 150 may be executed at least in part by one or more of the controller(s) 736.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the High Definition ("HD") map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.). In some embodiments, visualization 165 may be presented on HMI display 734.

The vehicle 700 further includes a network interface 724 which may use one or more wireless antenna(s) 726 and/or modem(s) to communicate over one or more networks. For example, the network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 726 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 7B:
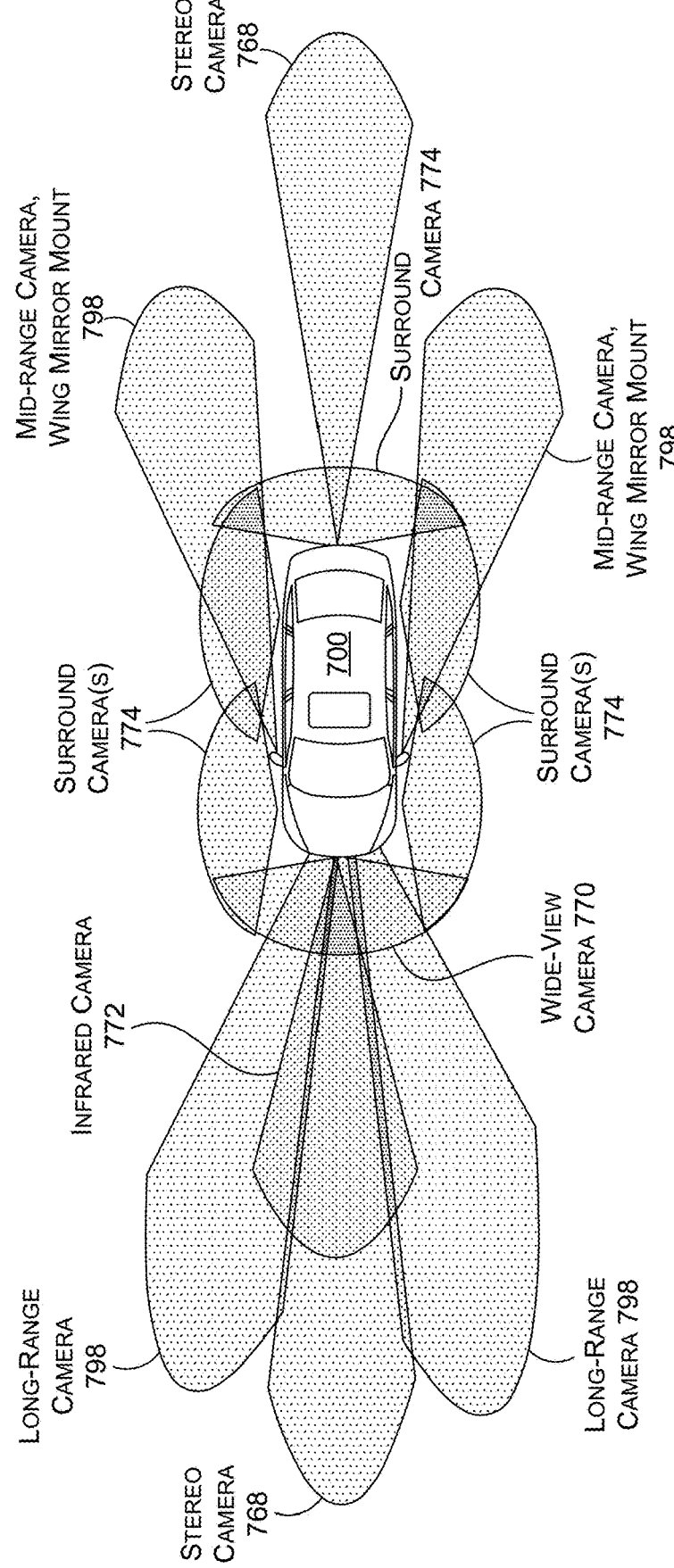
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700. In some embodiments, image sensors 105 may be implemented using one or more of the cameras discussed with respect to FIG. 7B.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may be any number (including zero) of wide-view cameras 770 on the vehicle 700. In addition, any number of long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

Any number of stereo cameras 768 may also be included in a front-facing configuration. In at least one embodiment, one or more of stereo camera(s) 768 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Cameras with a field of view that include portions of the interior environment within the cabin of the vehicle 700 (e.g., one or more OMS sensor(s) 701) may be used as part of an occupant monitoring system (OMS) such as, but not limited to, a driver monitoring system (DMS). For example, OMS sensors (e.g., the OMS sensor(s) 701) may be used (e.g., by the controller(s) 736) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to enable gaze-controlled operations triggered by driver and/or non-driver occupants such as, but not limited to, adjusting cabin temperature and/or airflow, opening and closing windows, controlling cabin lighting, controlling entertainment systems, adjusting mirrors, adjusting seat positions, and/or other operations. In some embodiments, an OMS may be used for applications such as determining when objects and/or occupants have been left behind in a vehicle cabin (e.g., by detecting occupant presence after the driver exits the vehicle).

Figure 7C:
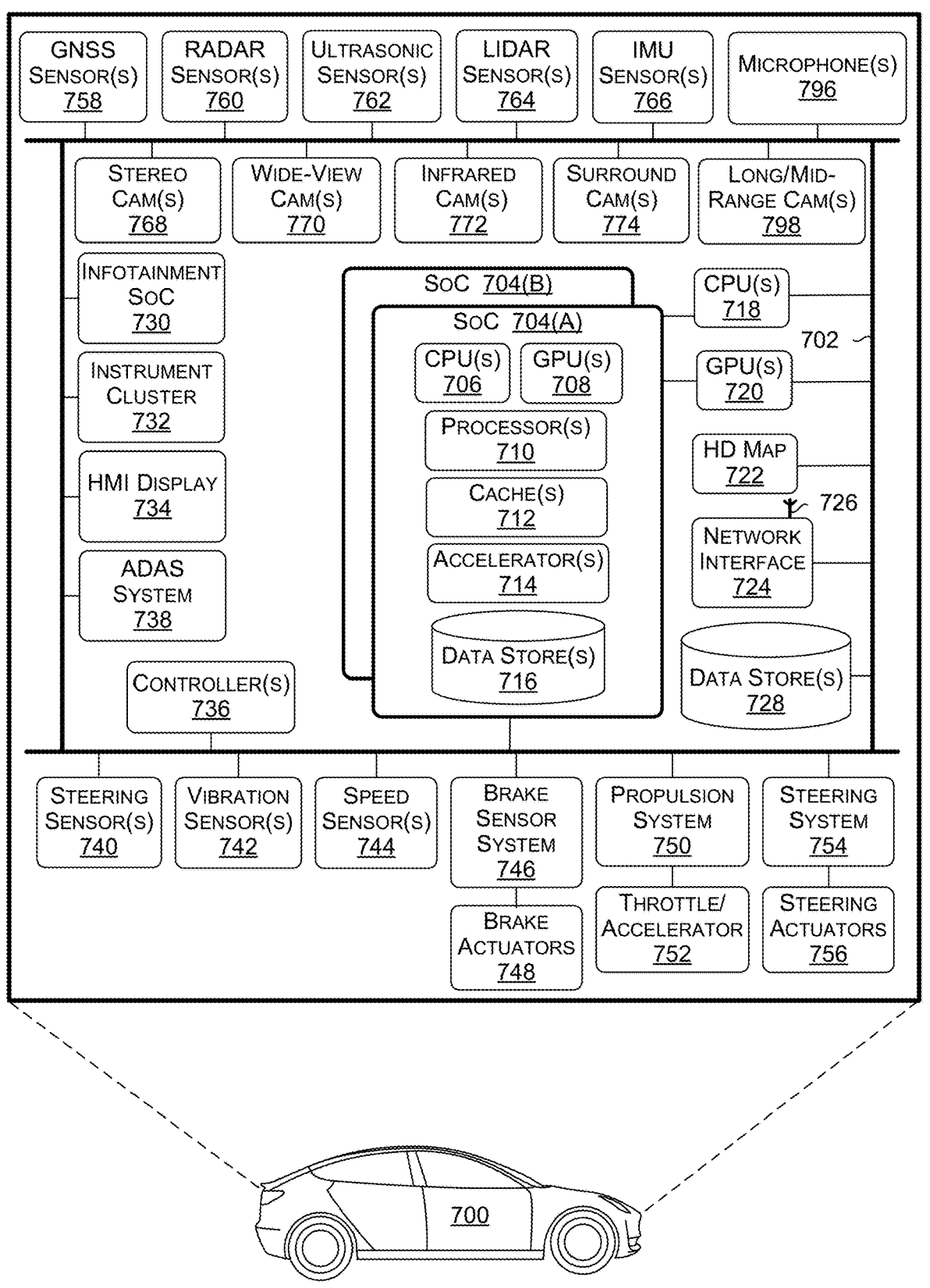
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D). In some embodiments, one or more aspects of the parameter harmonization function 120 and/or stitching module 150 may be executed at least in part by one or more of the SoC(s) 704.

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))—or other math coprocessor or numeric coprocessor types—for performing mathematical operations within the system. For example, the SoC(s) 704 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA).

The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 716 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's info-tainment system and settings, or provide voice-activated web surfing. Certain functions are available to the driver only when the vehicle is operating in an autonomous mode, and are disabled otherwise.

The video image compositor may include enhanced tem-poral noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image com-positor may be used to offload the GPU(s) 708 to improve performance and responsiveness.

The SoC(s) 704 may further include a mobile industry processor interface (MIPI) camera serial interface for receiv-ing video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with periph-erals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass stor-age controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety archi-tecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and function-ality that cannot be achieved by conventional systems. For example, computer vision algorithms may be executed on CPUs, which may be configured using high-level program-ming language, such as the C programming language, to execute a wide variety of processing algorithms across a wide variety of visual data. However, CPUs are oftentimes unable to meet the performance requirements of many computer vision applications, such as those related to execu-tion time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration clus-ter, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Com-plex) that when flashing lights are detected, icy conditions exist. The flashing light may be identified by operating a third deployed neural network over multiple frames, inform-ing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detec-tion and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and require-ments for the vehicle 700, and any combination of camera types may be used to provide the necessary coverage around the vehicle 700. In addition, the number of cameras may differ depending on the embodiment. For example, the vehicle may include six cameras, seven cameras, ten cam-eras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road sur-faces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longi-tudinal ACC monitors and controls the distance to the vehicle immediately ahead of the vehicle 700 and automati-cally adjust the vehicle speed to maintain a safe distance from vehicles ahead. Lateral ACC performs distance keep-ing, and advises the vehicle 700 to change lanes when necessary. Lateral ACC is related to other ADAS applica-tions such as LCA and CWS.

CACC uses information from other vehicles that may be received via the network interface 724 and/or the wireless antenna(s) 726 from other vehicles via a wireless link, or indirectly, over a network connection (e.g., over the Inter-net). Direct links may be provided by a vehicle-to-vehicle (V2V) communication link, while indirect links may be infrastructure-to-vehicle (I2V) communication link. In gen-eral, the V2V communication concept provides information about the immediately preceding vehicles (e.g., vehicles immediately ahead of and in the same lane as the vehicle 700), while the I2V communication concept provides infor-mation about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(D) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
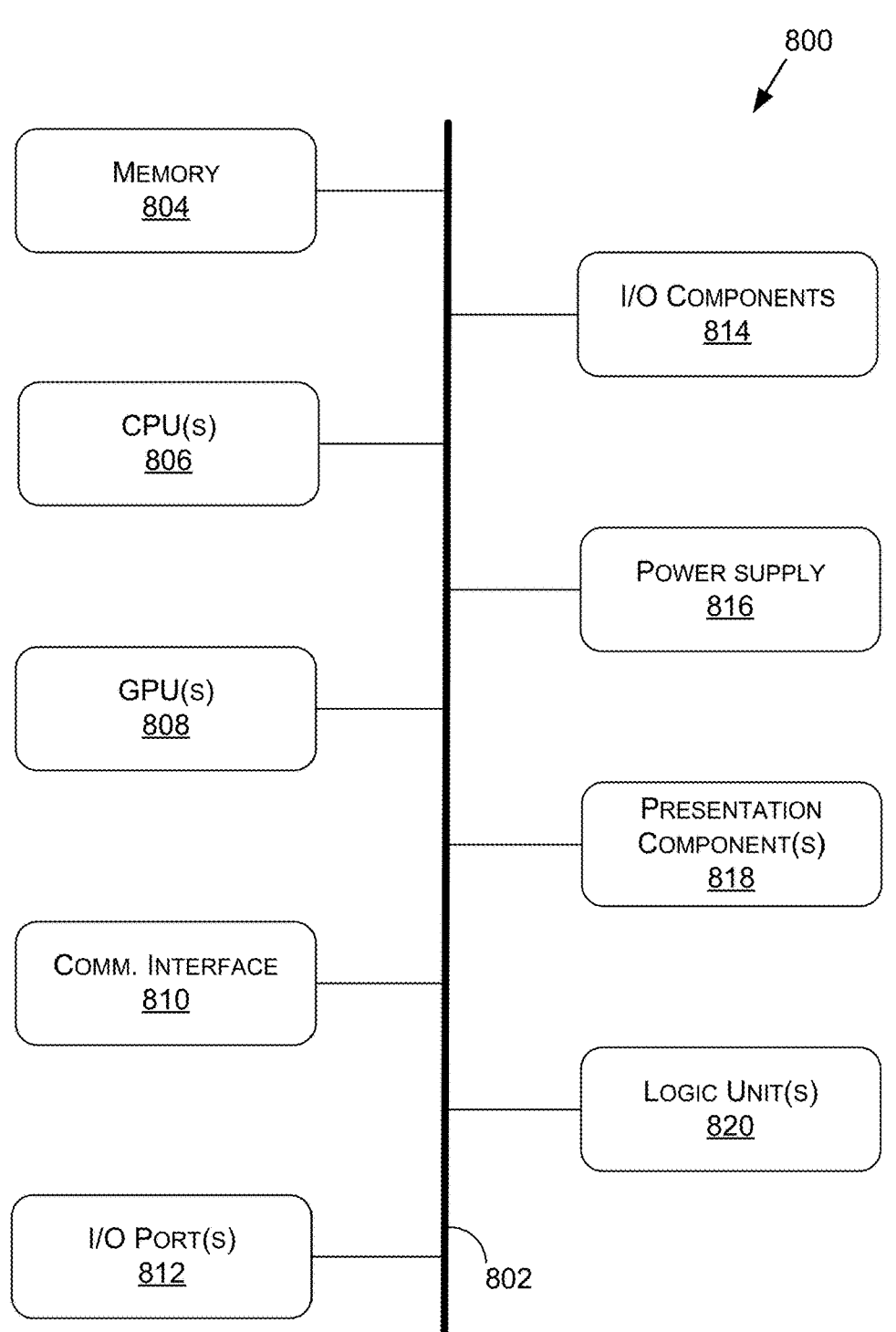
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8. In some embodiments, one or more aspects of the parameter harmonization function 120 and/or stitching module 150 may be executed at least in part by one or more of the CPUs 806 and/or GPUs 808.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.). In some embodiments, visualization 165 may be presented on a display of the presentation component(s) 818.

Example Data Center

Figure 9:
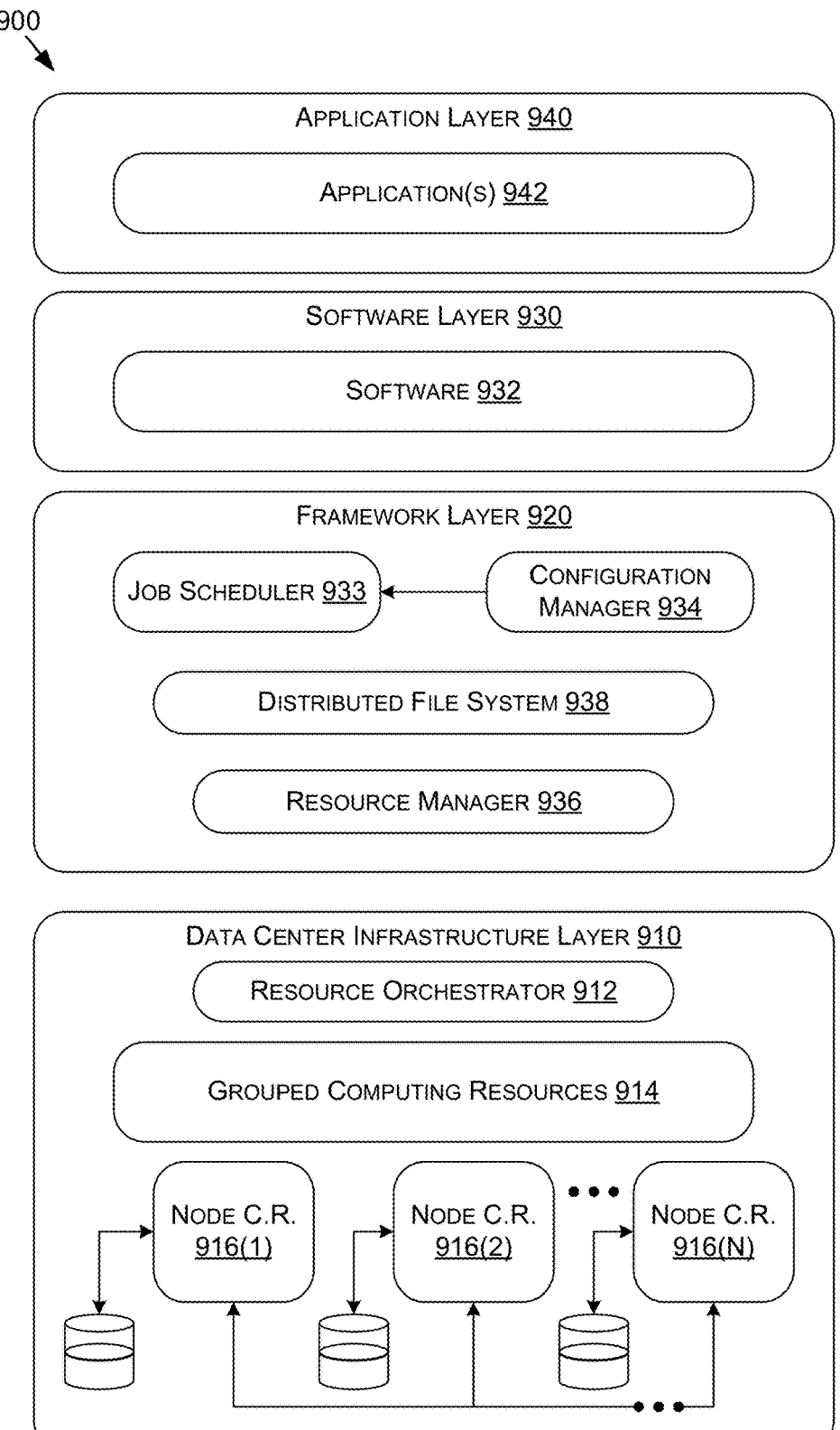
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM). In some embodiments, one or more aspects of the parameter harmonization function 120 and/or stitching module 150 may be executed at least in part by one or more of the C.R.s 916(1)-916(N).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising one or more processing units to:

determine a first parameter value associated with rendering a first image and a second parameter value associated with rendering a second image, wherein the first image at least partially overlaps at an image border with the second image;

compute a boundary parameter value based at least on the first parameter value and the second parameter value;

apply a first parameter gain function that adjusts the first parameter value in at least a portion of the first image directionally toward the boundary parameter value at the image border;

apply a second parameter gain function that adjusts the second parameter value in at least a portion of the second image directionally toward the boundary parameter value at the image border; and stitch the first image to the second image at the image border.

2. The one or more processors of claim 1, wherein the first parameter value and the second parameter value are associated with a rendering parameter comprising at least one of:

white balance, tone mapping, exposure time, brightness, contrast, gamma, hue, noise reduction, saturation, sharpness, color filter array (CFA) pattern, lens shading correction, lens distortion correction, focal length correction, barrel distortion correction, or pincushion distortion.

3. The one or more processors of claim 1, wherein the one or more processing units are further to compute the boundary parameter value at the image border between the first and second images based at least on an average computed using the first parameter value and the second parameter value.

4. The one or more processors of claim 1, wherein the one or more processing units are further to:
   determine the first parameter value based on metadata corresponding to the first image; and
   determine the second parameter value based on metadata corresponding to the second image.

5. The one or more processors of claim 1, wherein the one or more processing units are further to:
   determine the first parameter value based on metadata associated with a characteristic of a first camera used to capture the first image; and
   determine the second parameter value based on metadata associated with the characteristic of a second camera used to capture the second image.

6. The one or more processors of claim 1, wherein at least one of the first parameter gain function or the second parameter gain function comprises a linear function, a non-linear curve function, an s-curve function, or a logistic curve function.

7. The one or more processors of claim 1, wherein the one or more processing units are further to adjust a rate of change of at least one of the first parameter gain function or the second parameter gain function based at least on a difference in lighting between the first and second images.

8. The one or more processors of claim 1, wherein the one or more processing units are further to generate at least one of:
   a surround-view stitched image based at least on the first image and the second image;
   a fisheye-view stitched image based at least on the first image and the second image; and
   a panoramic-view stitched image based at least on the first image and the second image.

9. The one or more processors of claim 1, wherein the first image is captured by a first camera and the second image is captured by a second camera, the first and second cameras having an at least partially overlapping field of view.

10. The one or more processors of claim 1, wherein the one or more processors are comprised in at least one of:
   a control system for an autonomous or semi-autonomous machine;
   a perception system for an autonomous or semi-autonomous machine;
   a system for performing simulation operations;
   a system for performing digital twin operations;
   a system for performing light transport simulation;
   a system for performing collaborative content creation for three-dimensional assets;
   a system for performing deep learning operations;
   a system for performing remote operations;
   a system for performing real-time streaming;
   a system for generating or presenting one or more of augmented reality content, virtual reality content, or mixed reality content;
   a system implemented using an edge device;
   a system implemented using a robot;
   a system for performing conversational AI operations;

a system implementing one or more language models;
   a system implementing one or more large language models (LLMs);
   a system for generating synthetic data;
   a system for generating synthetic data using AI;
   a system incorporating one or more virtual machines (VMs);
   a system implemented at least partially in a data center; or
   a system implemented at least partially using cloud computing resources.

11. A system comprising:
   one or more processing units to:
      determine a first parameter value associated with a metadata parameter for a first image of a plurality of images;
      compute a first boundary value based at least on the first parameter value and a second parameter value associated with the metadata parameter for a second image of the plurality of images;
      compute a second boundary value based at least on the first parameter value and a third parameter value associated with the metadata parameter for a third image of the plurality of images;
      apply a first parameter gain function that adjusts the first parameter value in at least a first portion of the first image directionally toward the first boundary value at a first image border of the first image; and
      apply a second parameter gain function that adjusts the first parameter value in at least a second portion of the first image directionally toward the second boundary value at a second image border of the first image.

12. The system of claim 11, wherein the one or more processing units are further to:
   stitch the first image to the second image based on an overlapping image border between the first image and the second image; and
   stitch the first image to the third image based on an overlapping image border between the first image and the third image.

13. The system of claim 11, wherein the first parameter value and the second parameter value are associated with a rendering parameter comprising at least one of: white balance, tone mapping, exposure time, brightness, contrast, gamma, hue, noise reduction, saturation, sharpness, color filter array (CFA) pattern, lens shading correction, lens distortion correction, focal length correction, barrel distortion correction, or pincushion distortion.

14. The system of claim 11, wherein the one or more processing units are further to:
   compute the first boundary value at the first image border between the first and second images based at least on an average computed using the first parameter value and the second parameter value; and
   compute the second boundary value at the second image border between the first and third images based at least on an average computed using the first parameter value and the third parameter value.

15. The system of claim 11, wherein the one or more processing units are further to:
   determine the first parameter value based on metadata corresponding to the first image;
   determine the second parameter value based on metadata corresponding to the second image; and
   determine the third parameter value based on metadata corresponding to the third image.

16. The system of claim 11, wherein the one or more processing units are further to:

determine the first parameter value based on metadata associated with a characteristic of a first camera used to capture the first image;

determine the second parameter value based on metadata associated with the characteristic of a second camera used to capture the second image; and determine the third parameter value based on metadata associated with the characteristic of a third camera used to capture the second image.

17. The system of claim 11, wherein at least one of the first parameter gain function or the second parameter gain function comprises a linear function, a non-linear curve function, an s-curve function, or a logistic curve function.

18. The system of claim 11, wherein the one or more processing units are further to adjust a rate of change of at least one of the first parameter gain function or the second parameter gain function based at least on a difference in lighting between the first image and at least one of the second or third images.

19. The system of claim 11, wherein the one or more processing units are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for three-dimensional assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more language models;

a system implementing one or more large language models (LLMs);

a system for generating synthetic data;

a system for generating synthetic data using AI;

a system incorporating one or more virtual machines (VMs);

a system implemented at least partially in a data center; or a system implemented at least partially using cloud computing resources.

20. A method comprising:

stitching a first image to a second image that at least partially overlaps with the first image at an image border, the stitching being based at least on adjusting the first image by blending a metadata parameter of the first image directionally toward the image border from a first value of the metadata parameter at a first position within the first image to a second value of the metadata parameter at a second position at the image border, wherein the second value is computed based at least on the first value of the metadata parameter and a third value of the metadata parameter associated with the second image.

\* \* \* \* \*